United States Patent [19]
Shimoseki

[11] Patent Number: 6,050,557
[45] Date of Patent: *Apr. 18, 2000

[54] COILED DISK SPRING

[75] Inventor: Masayoshi Shimoseki, Tokyo, Japan

[73] Assignee: Mitsubshi Steel Mfg. Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/704,439

[22] Filed: Aug. 16, 1996

[30] Foreign Application Priority Data

Aug. 28, 1995 [JP] Japan ................................. 7-218981
May 7, 1996 [JP] Japan ................................. 8-112614

[51] Int. Cl.[7] ................................. F16F 1/20; F16F 1/06
[52] U.S. Cl. ..................... 267/162; 267/164; 267/180
[58] Field of Search ..................... 267/158, 161, 267/162, 164, 165, 166, 180

[56] References Cited

U.S. PATENT DOCUMENTS

| | | | |
|---|---|---|---|
| 2,982,323 | 5/1961 | Vossloh et al. | 267/280 X |
| 3,029,071 | 4/1962 | Wells | 267/161 |
| 3,308,229 | 3/1967 | Burniston | 267/180 |
| 4,531,016 | 7/1985 | Duve | 267/180 X |
| 4,752,178 | 6/1988 | Greenhill | 411/521 |
| 4,901,987 | 2/1990 | Greenhill et al. | 267/166 |
| 5,558,393 | 9/1996 | Hawkins et al. | 267/162 |
| 5,639,074 | 6/1997 | Greenhill et al. | 267/162 |
| 5,803,444 | 9/1998 | Shibuya et al. | 267/180 |

FOREIGN PATENT DOCUMENTS

| | | | |
|---|---|---|---|
| 58-178032 | 10/1983 | Japan . | |
| 5-54833 | 7/1993 | Japan . | |
| 68039 | 7/1944 | Norway | 267/180 |
| 798382 | 1/1981 | U.S.S.R. | 267/180 |
| 2055445 | 3/1981 | United Kingdom | 267/167 |

*Primary Examiner*—Paul N. Dickson
*Assistant Examiner*—Robert A. Siconolfi
*Attorney, Agent, or Firm*—Flynn, Thiel, Boutell & Tanis, P.C.

[57] ABSTRACT

A coiled disk spring is prepared by closely winding a strip having a noncircular cross section into a coil shape with the face inclined at a predetermined angle with respect to the axis of the coil. The sectional shape of the strip may be appropriately selected in accordance with the intended use and, for example, when it is triangular or trapezoidal, a coiled disk spring having progressive nonlinear characteristics can be obtained. A coiled wave disk spring having progressive nonlinear characteristics can also be prepared by closely coiling the strip while bending the strip into a wavy form in the circumferential direction of the coiled spring.

5 Claims, 4 Drawing Sheets

LOAD-DEFLECTION CHARACTERISTICS

COILED DISK SPRING

BACKGROUND OF THE INVENTION

1. Field of the Invention

This invention relates to coiled disk springs used as a support for machines and appliances. More particularly, the present invention relates to a coiled disk spring formed by closely winding a deformed wire or a strip into a coil shape with the face of the wire or strip inclined with respect to the coil axis and further to a coiled disk spring obtained by undulating this coiled disk spring in a circumferential direction of the coil.

2. Description of the Prior Art

Disk springs have heretofore been used as support springs for machines and appliances in which a plurality of disk springs 2 are stacked up in parallel with one another, as shown in FIG. 8, so that the restoring force as springs is increased.

However, in the production of disk springs, since a sheet material must be punched out by a press, there is such a problem that the yield of the material is low and the production cost is high.

When the sheet material is punched out by the press, the resulting springs can only have a predetermined thickness.

Further, when the disk springs are assembled into a stack 3 by stacking up the springs, mistakes are likely to occur, such as variations in the number of disk springs to be stacked up or mixing of inverted pieces in the stack.

A coiled wave spring as shown in FIGS. 9 and 10 has also been employed. This spring is produced by closely winding a strip 5 into a coil shape while bending the strip into a wavy form 6 in the circumferential direction of the coil as shown in FIG. 10.

When a load in the vertical direction is applied to this coiled wave spring, the wavy form 6 deforms flat, so that elasticity develops and gives a supporting force to the load.

The load-deflection characteristics of a conventional coiled wave spring are shown by the dashed line A in FIG. 7. As shown in the drawing, this wave spring exhibits linear characteristics such that the load and deflection are proportional to each other.

In order to obtain nonlinear characteristics (hereinafter, referred to as "progressive nonlinear characteristics") providing large flexibility at the initial load and small flexibility at a large load, at least two kinds of springs must be combined with one another.

SUMMARY OF THE INVENTION

An object of the present invention is to provide a coiled disk spring having characteristics which cannot be obtained by conventional disk springs or coiled wave springs as mentioned above, while retaining the merits of these conventional springs.

More particularly, the present invention contemplates springs which give a a high yield of materials at the time of production and has high design freedom. Further, the present invention is directed to provide a spring having the foregoing progressive nonlinear characteristics, in accordance with the application, using only one kind of spring.

The objects of the invention described above can be accomplished by the coiled disk springs as set forth below.

The coiled disk springs according to the present invention will be explained more specifically. In the basic form of the spring of the present invention, a strip having a noncircular cross section, such as a rectangular or an oval having major and minor directions, is wound into a coil shape with the face of the strip inclined at a predetermined angle with respect to the center axis, like disk springs.

The cross-section of the strip may be triangular or trapezoidal. When such a strip is coiled, the contact area between adjacent turns of the coiled strip is gradually increased with an increase in the applied load and progressive nonlinear characteristics can be obtained.

Further, according to another aspect of the present invention, there is also provided a composite spring having the characteristics of a coiled wave spring, as well as those of the above-mentioned coiled disk spring. Such a composite disk spring, i.e., a coiled wave disk spring, is prepared by closely coiling a strip having a noncircular section as described above while bending the strip into a wavy form in the circumferential direction of the coiled spring. An initial load applied to this coiled wave disk spring levels the inclination in the width direction of the strip and stretches the wavy portion. A further increased load no longer changes the inclination but stretches the wavy portions flat.

In the preparation of the springs of the present invention, a known spring steel may be used.

BRIEF DESCRIPTION OF THE DRAWINGS

FIG. 3A and 3B are explanatory views of further specific examples of the coiled disk springs according to the present invention, wherein FIG. 3A shows a spring having a trapezoidal section and FIG. 3B shows a spring having a triangular section;

DETAILED DESCRIPTION OF THE PREFERRED EMBODIMENTS

Figure 1:
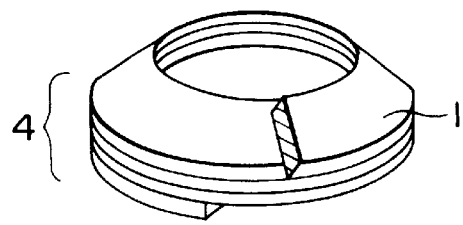
FIG. 1 is an explanatory view of a specific example showing a basic type of coiled disk spring according to the present invention.
Figure 8:
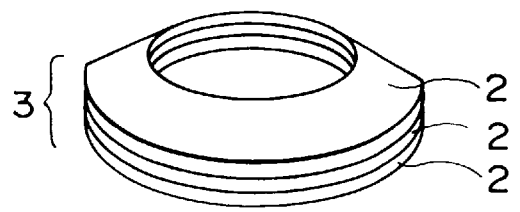
FIG. 8 is an explanatory view showing an example of a prior art spring assembly produced by stacking disk springs in parallel with one another.
Figure 9:
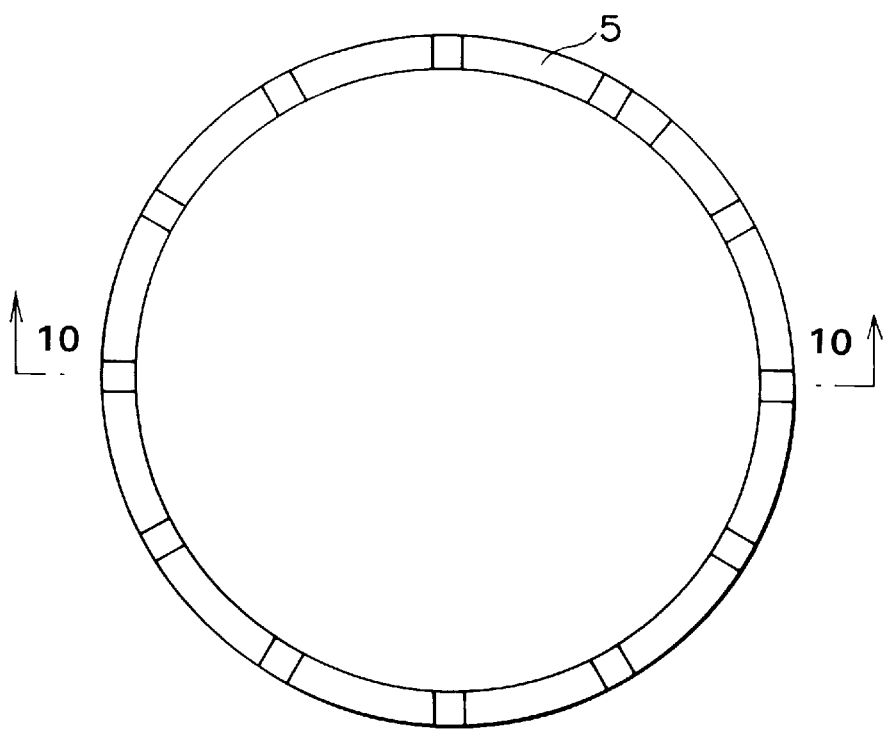
FIG. 9 is a plan view showing an example of a coiled wave spring according to the prior art.

The present invention will be explained more specifically with reference to the accompanying drawings. In the prior art, a plurality of disk springs 2 are stacked in parallel with one another to form a stack 3, as shown in FIG. 8. In contrast, a coiled disk spring 4 according to the present invention is produced by winding closely a strip 1 having, for example, a rectangular section, into a coil shape with its a face inclined at a predetermined angle with respect to the center axis of the coil as shown in FIG. 1. A deformed wire material obtained by rolling a round wire or a band-like material whose edges have been trued up by a slitter, can be used as the strip having such a sectional shape.

Figure 2:
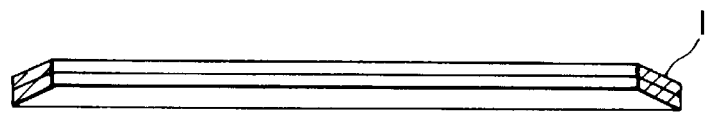
FIG. 2 is a sectional view of the basic coiled disk spring shown in FIG. 1.
Figure 7:
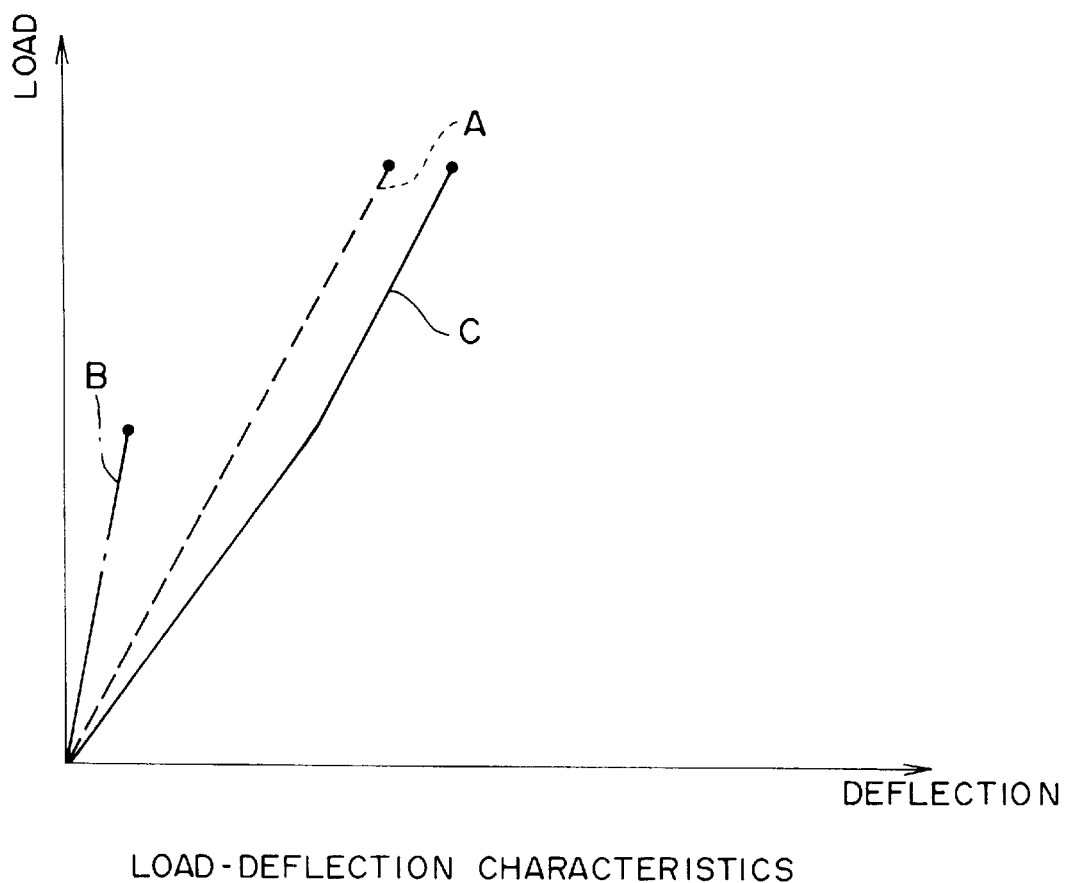
FIG. 7 is a graph showing load-deflection characteristics of a coiled wave disk spring in comparison with a coiled wave spring and a coiled disk spring.

FIG. 2 shows the sectional view of the basic coiled disk spring shown in FIG. 1. This coiled disk spring is produced by closely coiling a strip 1 with its face inclined at a predetermined angle with respect to the coil axis. When a load in a vertical direction acts on the coiled disk spring, the inclination in the direction of the width of the coiled strip 1 becomes horizontal, thereby generating an elastic force which acts as a support against the load. The spring characteristics are shown by a one-dot chain line B in FIG. 7.

Figure 3A:
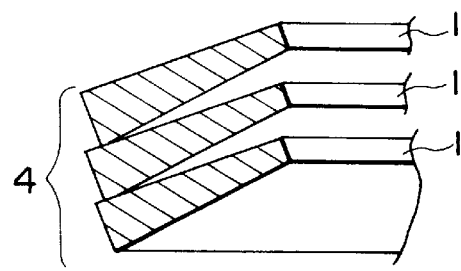
Figure 3B:
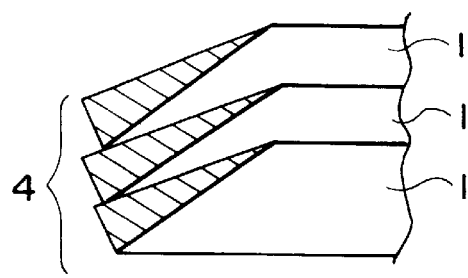

FIGS. 3A and FIG. 3B show examples of coiled disk springs 4 according to the present invention using a strip 1 having a trapezoidal section and a triangular section, respectively. When the thickness of the section is changed so that it is different between the central and peripheral portions, characteristics which cannot be obtained by the conventional disk springs can be obtained.

Figure 4:
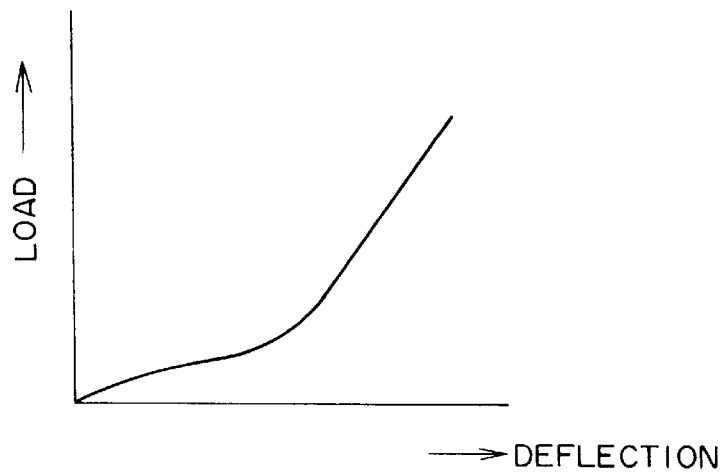
FIG. 4 is a graph conceptually showing spring characteristics of the coiled disk springs shown in FIGS. 3A and 3B.

In other words, when a compressive force acts on the coiled disk spring, the inner portion first undergoes deformation and the springs gradually come into close contact with one another throughout the entire surface. Thereafter, the coiled disk spring undergoes deformation as a whole. For this reason, the spring characteristics exhibit progressive nonlinear characteristics as shown in FIG. 4.

To produce such a coiled disk spring, a deformed wire is closely wound into a coil shape.

Heat-treatment is carried out either before or after shaping to improve the material strength and to obtain a required spring strength. In this case, the angle of inclination is provided with respect to the center axis of the coil or in other words, a gradient is provided to the disk shape, and this work is carried out at the time of heat-treatment before or after shaping.

Figure 5:
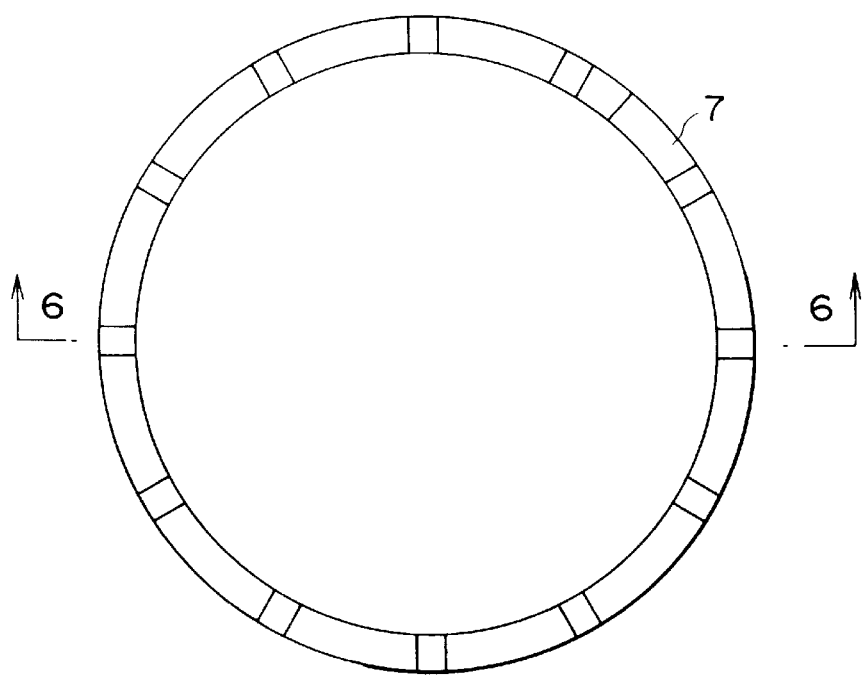
FIG. 5 is a plan view showing a specific example of the coiled wave disk spring which is undulated in a circumferential direction according to the present invention.
Figure 6:
FIG. 6 is a sectional view of the coiled wave disk spring shown in FIG. 5 and taken along a line I—I.

FIG. 5 is a plan view of an embodiment of the wavy coiled disk spring and FIG. 6 is a sectional view taken along a line I—I of FIG. 5. The strip 7 is closely wound into a coil shape with its face inclined at a predetermined angle with respect to the coil axis, while being undulated into a wavy form 8 in the circumferential direction of the coil, as shown in FIG. 6.

As an example, the strip 7, having a thickness of 1.1 mm and a width of 3.0 mm, was closely coiled at an angle of inclination of 9.6° with respect to the direction of strip width to provide a coil shape having an outer diameter of 147.5 mm. The number of waves of the wavy form 8 was 12.

Figure 10:
FIG. 10 is a sectional view taken along a line IV—IV of FIG. 9.

When a load is applied in a vertical direction to the coiled wave disk spring shown in FIGS. 5 and 6, the inclination in the width direction of the strip 7 comes in the horizontal direction at the initial stage and, at the same time, the wavy form 8 is stretched so as to be flat. Therefore, the coiled wave disk spring exhibits a softer spring constant than the basic coiled disk spring as shown in FIGS. 1 and 2 and the conventional coiled wave spring shown in FIG. 10.

When the load applied to the strip 7 in the vertical direction becomes great, the inclination in the width direction of the strip 7 becomes horizontal and does not change any longer. Therefore, the coiled wave disk spring exhibits a slightly hard spring constant having only flexibility that makes the wavy form 8 flat. Therefore, the coiled wave disk spring behaves as a coiled disk spring, as represented by a solid line C in FIG. 7.

As described above, the coiled disk spring according to the present invention provides the following effects. Since the strip is coiled, the yield of the materials is considerably improved as compared with the conventional disk springs and the yield is substantially 100%.

Since a spring assembly corresponding to a plurality of disk springs of the prior art is unitary, the assembly work and management can be made easily.

A difference in thickness can be made between the inner and outer portions by changing the sectional shape of the strip as the raw material. As a result, springs having desired progressive nonlinear characteristics in accordance with the application can be produced.

Further, when the coiled disk spring according to the present invention is bent into a wavy form in the circumferential direction, only one kind of spring can provide the above-mentioned progressive nonlinear spring characteristics.

What is claimed is:

1. A coiled disk spring having progressive nonlinear characteristics, said spring comprising a strip having an upper face, a lower face and a noncircular cross-section and wound undulatingly in a circumferential direction into a plurality of coils, the upper and lower faces of adjacent coils being in contact with each other and inclined with respect to the vertical axis of the spring substantially throughout the length of the wound strip.

2. A coiled disk spring according to claim 1 wherein the cross-section of said strip is rectangular.

3. A coiled disk spring undulated in a circumferential direction according to claim 1, wherein the cross-section of said strip is oval.

4. A coiled disk spring undulated in a circumferential direction according to claim 1, wherein the cross-section of said strip is triangular.

5. A coiled disk spring undulated in a circumferential direction according to claim 1, wherein the cross-section of said strip is trapezoidal.

* * * * *